J. B. H. LEONARD.
TABLE CUTLERY.

No. 179,482.            Patented July 4, 1876.

Witnesses
J H Shumway
Clara Broughton

John B. H. Leonard
Inventor
By Atty.

UNITED STATES PATENT OFFICE.

JOHN B. H. LEONARD, OF NEW BRITAIN, ASSIGNOR TO THE FRARY CUTLERY COMPANY, OF BRIDGEPORT, CONNECTICUT.

IMPROVEMENT IN TABLE-CUTLERY.

Specification forming part of Letters Patent No. 179,482, dated July 4, 1876; application filed March 9, 1876.

*To all whom it may concern:*

Be it known that I, JOHN B. H. LEONARD, of New Britain, in the county of Hartford and State of Connecticut, have invented a new Improvement in Table-Cutlery; and I do hereby declare the following, when taken in connection with the accompanying drawings and the letters of reference marked thereon, to be a full, clear, and exact description of the same, and which said drawings constitute part of this specification, and represent, in—

Figure 1:
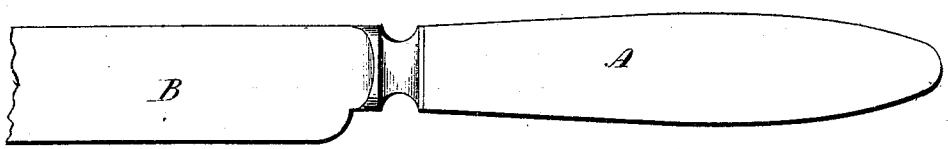
Figure 2:
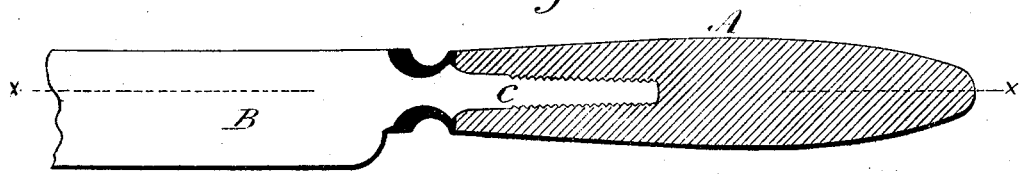
Figure 3:
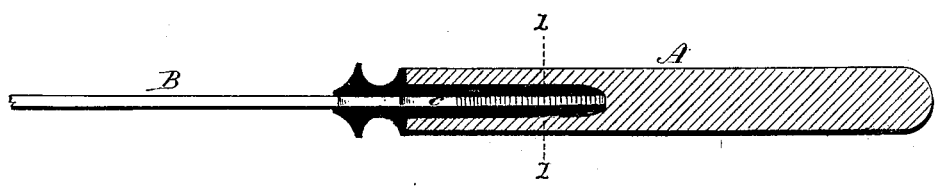
Figure 4:

Figure 1, side view; Fig. 2, longitudinal central section in the plane of the blade; Fig. 3, section on line $xx$; Fig. 4, section on line $zz$.

This invention relates to an improvement in the method of securing the handles to table-cutlery, and particularly to that class in which the blade or fork is formed with a thin flat tang, and onto which a bolster is cast, the object being to make a secure and inseparable connection between the handle and tang; and it consists in forming the tang with a screw-thread cut upon its two edges, and the handle bored the diameter corresponding to the width of the tang, and so that the thread on the sides of the tang will engage with the surface of the cavity in the handle, the said screw serving as a means for securing the two together, and then a filling run into the cavity in the handle, each side of the tang, prevents the unscrewing of the tang from the handle.

The handle A and blade B are of substantially the usual form. The blade is constructed with a flat tang, C, and with a screw-thread cut on its two edges. The handle is bored out to form a cylindrical cavity, the diameter of which corresponds to the threaded tang. Into this cavity the tang is screwed, the thread working its way until the blade is drawn toward the handle into its proper relative position. Then, placed in suitable molds, metal is poured around the heel of the blade to form the bolster, and flows into the cavity in the handle, each side of the tang, as shown in Fig. 3. This inseparably secures the handle and blade together.

Other filling may be employed, if desirable, than that which forms the bolster, but that is preferable.

It will be understood that, while a knife only is shown, this invention applies also to forks and to other articles in the class of cutlery.

I claim—

The herein-described method of attaching handles to cutlery, consisting of the flat threaded tang screwed into the cavity in the handle, combined with a filling in the said cavity on the side of the tang, substantially as set forth.

JOHN B. H. LEONARD.

Witnesses:
 JOHN E. EARL,
 CLARA BROUGHTON.